(12) United States Patent
Bardon et al.

(10) Patent No.: US 6,179,487 B1
(45) Date of Patent: *Jan. 30, 2001

(54) DATA PROCESSING SYSTEM AND METHOD FOR ASSOCIATING SPECIFIC GRAPHICS WITH DATA PROCESSING APPLICATIONS

(75) Inventors: Didier Daniel Claude Bardon, Austin; Richard Edmond Berry, Georgetown; Shirley Lynn Martin, Austin; Scott Anthony Morgan, Austin; John Martin Mullaly, Austin; Craig Ardner Swearingen, Austin, all of TX (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/897,407

(22) Filed: Jul. 21, 1997

(51) Int. Cl.[7] .................................................. G06F 1/02
(52) U.S. Cl. ................................. 395/349; 345/353
(58) Field of Search .................................... 395/339, 340, 395/348, 349, 350, 351, 352, 353, 354–355, 356–357, 326–338, 600

(56) References Cited

U.S. PATENT DOCUMENTS

| | | | |
|---|---|---|---|
| 5,396,340 | * 3/1995 | Ishii et al. | 358/342 |
| 5,611,066 | * 3/1997 | Keele et al. | 395/427 |
| 5,880,388 | * 3/1999 | Kajiyama et al. | 84/609 |
| 5,884,298 | * 3/1999 | Smith, III et al. | 707/2 |

* cited by examiner

Primary Examiner—Steven Sax
(74) Attorney, Agent, or Firm—Winstead Sechrest & Minick P.C.; Volel Emile, Esq.

(57) ABSTRACT

A data processing system, software program, and method for operating each are implemented to associate title-specific visuals with unique audio compact discs for display on a graphical user interface. Additionally, the data processing system and software program provide a method of operation to display information associated with each unique compact disc as a separate entry within a compact disc library, such that an external user can then view the collection of libraries on the computer.

10 Claims, 8 Drawing Sheets

DATA PROCESSING SYSTEM AND METHOD FOR ASSOCIATING SPECIFIC GRAPHICS WITH DATA PROCESSING APPLICATIONS

CROSS-REFERENCE TO RELATED APPLICATIONS

The present application is related to the following co-pending applications:

Ser. No. 08/789,030, entitled "Data Processing System and Method for Simulating Compound Objects" filed Jan. 27, 1997; and Ser. No. 08/863,154, entitled "Interactive Display Interface for Media Presentation", filed May 23, 1997.

The above patent applications were assigned to the assignee of the present patent application.

TECHNICAL FIELD

The present invention relates in general to a graphical user interface, and in particular, to a graphical user interface which associates specific artwork with a data processing application.

BACKGROUND INFORMATION

As computers have developed to provide greater capabilities at greater speeds, the techniques for interacting with computers have also become much simpler. For example, icons provide pictorial representations of functions which may be executed by a computer and which allow a user to easily access a function with a simple click of a mouse or a stroke of a keyboard key. Icons, while providing an understandable interface, do not typically provide unique information associated only with an application or object to which it corresponds. For example, an icon which corresponds to a word processing application is the same for all documents created using that word processing application.

This limitation is especially apparent in compact disc (CD) player applications. In such applications, a compact disc (CD) may be inserted within a CD device of a data processing system and then played using a CD player application. After insertion of the CD, a CD player application within the data processing system then accesses a unique identifier stored on the compact disc itself. Such prior art systems then allow an external user to input a name of the compact disc and the name of individual tracts on the compact discs so that they are associated with a unique identifer. This information is kept in a private data file which is accessed only by the CD player application. An example of such a function is found in the Windows '95™ CD player application marketed by Microsoft Inc.

While the prior art CD system provides a user interface having a name which is easily recognizable, a same visual indicator for the compact disc and the compact disc player application is provided. Therefore, a need exists for an identification methodology and system for implementing that methodology which allow an external user to easily recognize compact discs that have been accessed by a compact disc player application, without the need for actually accessing the compact disc player application.

SUMMARY OF THE INVENTION

The previously mentioned needs are fulfilled with the present invention. Accordingly, there is provided, in a first form, a data processing system. The data processing system includes a central processing unit for executing a first data processing application and for creating a sub-director having a plurality of folders in response to the first data processing application. A first one of the plurality of folders stores a data set corresponding to a first object accessed by the first data processing application. The data processing system also includes a display device for displaying the first one of the plurality of folders in the data set corresponding to the first object, wherein the data set corresponds to a first characteristic of the first object.

Additionally, there is provided, in a second form, a method for operating a data processing system. The method includes the steps of executing a first data processing application using a central processing unit and creating a sub-directory having a plurality of folders in response to the first data processing application. The method also includes the steps of storing set corresponding to a first object accessed by the first data processing application in a first one of the plurality of folders and displaying the first one of the plurality of folders and the data set corresponding to the first object using a display device. The data set corresponds to a first characteristic of the first object.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
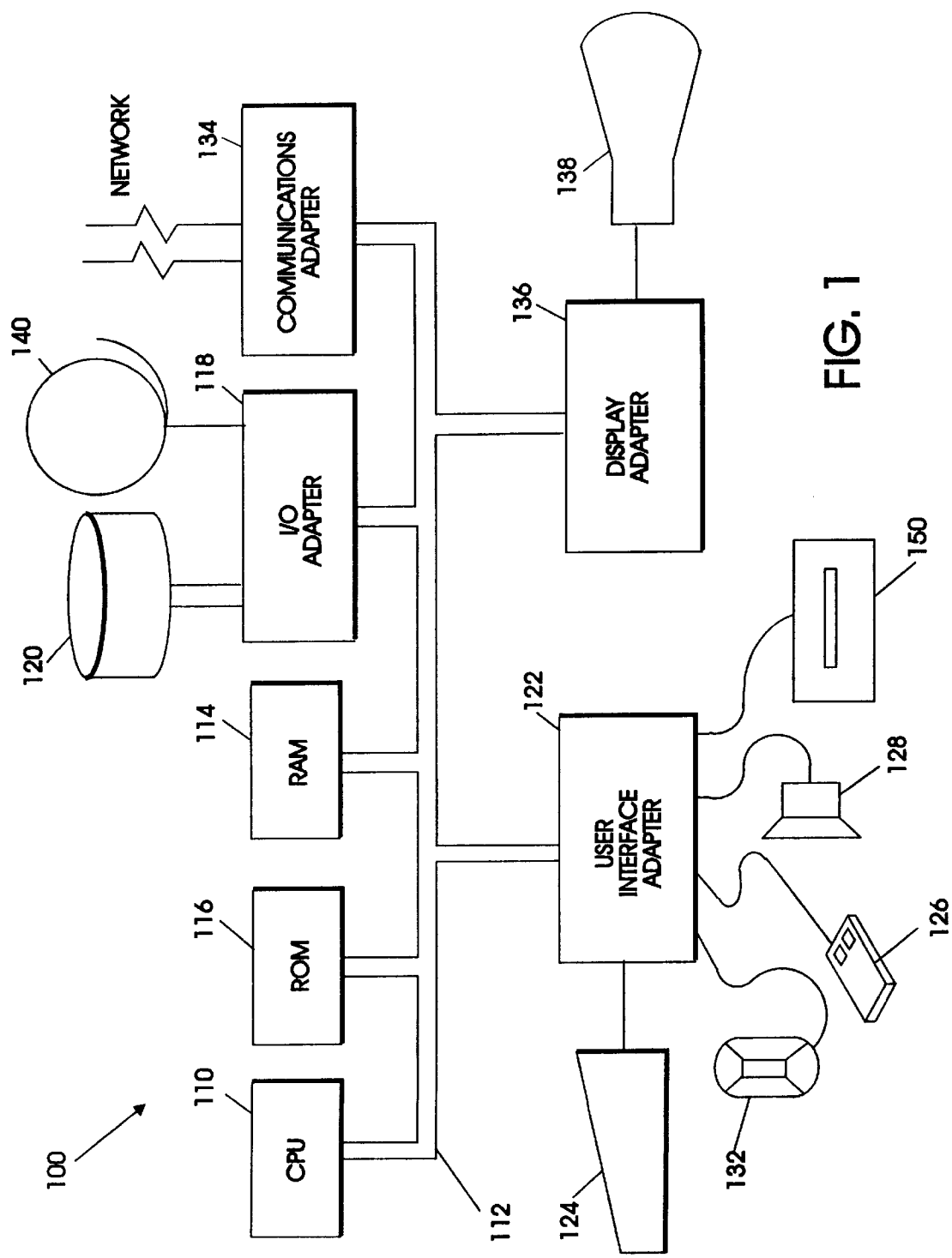
FIG. 1 illustrates, in block diagram form, a data processing system in accordance with one embodiment of the present invention.

The present invention provides a data processing system, software program, and method for operating each that associates title-specific visuals with unique audio compact discs for display on a graphical user interface. Additionally, the present invention provides a method of operation within the data processing system and software program to display information associated with each unique compact disc as a separate entry within a compact disc library, such that an external user can then view the collection of libraries on the computer.

During operation, the present invention uses a standard format of audio compact discs to access a unique identifier that is encoded for each compact disc title. The standard format is referred to as the "Red Book" standard and is used regularly throughout the data processing and audio industries. The "Red Book" is a published standard that was originated by Phillips and Sony. Each unique compact disc that is inserted in a CD-ROM drive of a data processing system is identified by this unique code. Furthermore, for each unique compact disc, a default name is initially assigned and a directory is created with that name. Default artwork, such as graphic images and text, are placed in this directory and are, thus, associated with the unique compact disc. The present invention implements this association with the use of software and hardware that provides a graphical user interface for playing compact discs and a graphical user interface that associate unique artwork with each compact disc. Furthermore, the present invention allows a user to edit and customize artwork and other title-specific information to suit each compact disc that is included within the library of compact discs. The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is illustrated of a data processing system 100 which may be used for the present invention.

Referring first to FIG. 1, an example is shown of a data processing, system 100 which may be used for the invention. The system has a central processing unit (CPU) 110, such as a PowerPC microprocessor ("PowerPC" is a trademark of IBM Corporation) according to *"The PowerPC Architecture: A Specification for a New Family of RISC Processors"*, 2d edition, 1994, Cathy May, et al. Ed., which is hereby incorporated herein by reference. A more specific implementation of a PowerPC microprocessor is described in the *"PowerPC 604: RISC Microprocessor User's Manual"*, 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120.

Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
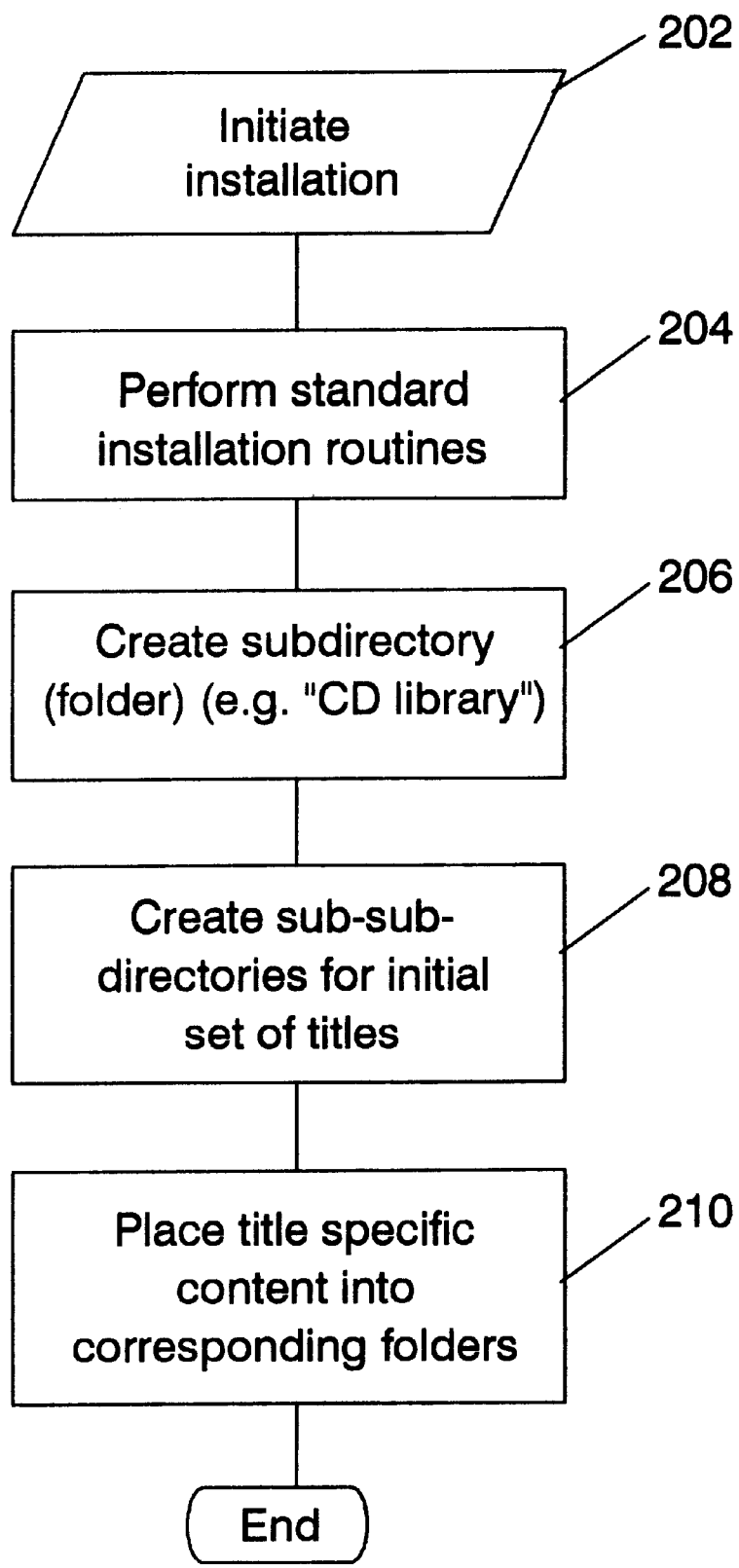
FIG. 2 illustrates, in flow diagram form, a methodology implemented for displaying an object on a display device in accordance with one embodiment of the present invention.

FIG. 2 illustrates a flow chart for installing a new compact disc and the information associated therewith into a compact disc library ("CD Library") which is accessible by an external user via display device 138 of data processing system 100. In a first step 202, an installation routine is initiated to install the software of the present invention within data processing system 100. During a step 204, standard installation routines are performed. Such standard installation routines may include creating a directory structure, un-compressing compressed files, and updating a system's configuration, among others. Such standard installation routines are well-known to those with skill in the data processing art and, therefore, will not be described in greater detail herein.

After standard installation routines are performed in step 204, a step 206 is executed to create a sub-directory, or folder. This sub-directory is the "CD Library." When the CD Library sub-directory is created, it becomes part of a collection of libraries that may be viewed by an external user on display device 138 of data processing system 100. Subsequently, "sub-sub-directories" are created for an initial set of CD titles in a step 208. Creation of sub-directories of a sub-directory is well-known to those with skill in the relevant art and, therefore, will not be described in greater detail herein.

After the creation of the sub-directory and its sub-sub-directories, software associated with the present invention then stores title specific data into corresponding sub-directories of the CD Library in a step 210. This title specific data stores data such as artwork. Thus, for each separate entry within the CD Library, a user is readily able to access or modify corresponding title specific information. Furthermore, the users can also observe an entry for each title in their CD Library.

Figure 3:
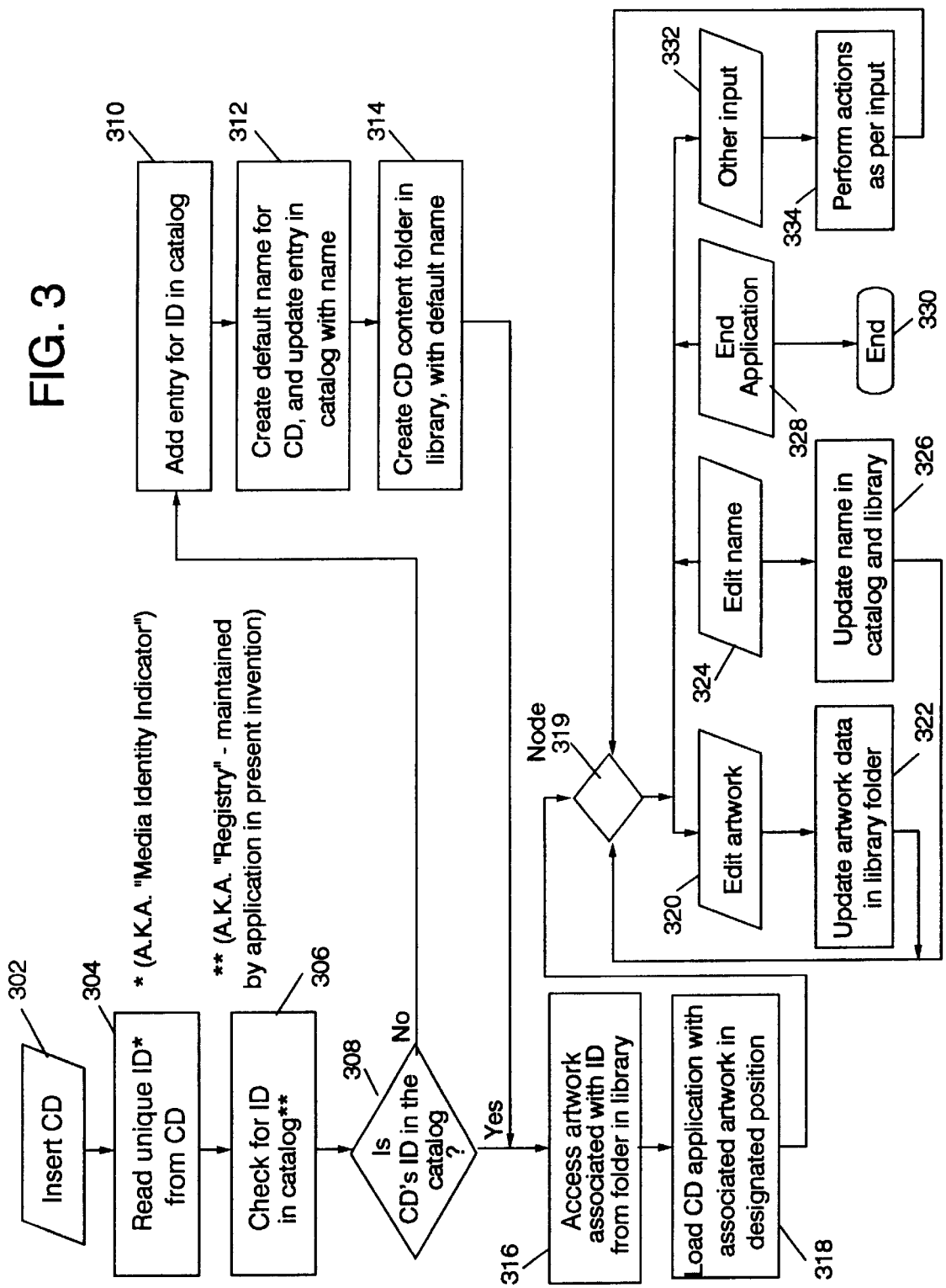
FIG. 3 illustrates, in flow diagram form, a methodology for displaying a list of objects on a display device in accordance with one embodiment of the present invention.

FIG. 3 illustrates a methodology implemented for modifying a name of a compact disc and the artwork associated with the visual display of the compact disc within the CD Library. In a first step 302 of FIG. 3, a compact disc is asserted into compact disc drive 150. Information provided from the compact disc is provided to CPU 110 via user interface adapter 122. Subsequently, a unique identifier is accessed from the compact disc in a step 304. This unique identifier is also known as a media identity indicator and is provided in compliance with a protocol referred to in the industry as the "Red Book."

This unique identifier is accessed by CPU 110 and compared with other unique identifiers stored within a catalog, or registry, of data processing system 100. It should be noted that the catalog, or registry, is stored in a file used by the software that is stored in a memory, such as ROM 116. This memory will typically be stored within a data file in ROM 116 and was created during the installation of the software methodology discussed in FIG. 2. Additionally, it should be noted that this memory may be referred to as a catalog, or as a registry in subsequent discussion of the present invention. It should be noted that the catalog is used by the software only when the CD Library is presented in the graphical user interface reuser's access. Stated another way, the catalog associates the unique codes with individual entries in the CD Library.

Subsequently, in step 308, CPU 110 determines whether the unique identifier associated with the inserted compact disc is stored within the catalog. If not, a program flow goes to step 310. In step 310, CPU 110 provides the appropriate control, data and address signals via bus 112 to add an entry for the unique identifier within the catalog stored in ROM 116. Subsequently, in step 312, a default name is created for the compact disc by CPU 110 as the unique identifier associated with the compact disc is not associated with a previously created folder. CPU 110 then updates the added entry in the catalog with the default name. In a step 314, a CD content folder is created in the CD library and is given the default name.

After execution of step 314 or if the unique identifier associated with the compact disc is stored in the catalog, a program flow goes to step 316. In step 316, CPU 110 accesses artwork associated with the unique identifier from a folder in the CD Library. This artwork may be custom artwork or a default artwork configuration stored within one of ROM 116 and RAM 114. After the artwork has been accessed from the folder in the library, the CD application, together with the associated artwork, is loaded into a designated position of the graphical user interface displayed on display device 138. This application is loaded under control of CPU 110 and display adapter 136 in a step 318.

Next, CPU 110 receives a user input via one of the plurality of user interface devices 124 through 150 through user interface adapter 122. Such user inputs may indicate that the artwork associated with the unique identifier of a compact disc should be edited, that a name associated with the unique identifier of the compact disc should be edited, that the application should be "ended," or that another input is received to define additional actions which may be executed.

Assume that the user interface indicates that artwork should be edited in a step 320. While a method for editing the artwork will subsequently be described in greater detail, it should be noted that the artwork may be customized in several manners. For example, several images may be provided with the CD player application itself and stored within RAM 114 upon installation of the CD player application. These images may then be provided to a graphical user interface displayed on display device 138 to allow a user to select one of these images to correspond with the CD that input to CD device 150 of data processing system 100 in step 302. Thus, to choose artwork from the list of available covers, the user may use one of the plurality of user interface devices 124–150 to select artwork from a list of titles on a graphical user interface. The artwork for the selected title will then be placed in a folder corresponding to the unique identifier of the inserted compact disc. This step takes place under control of CPU 110. Furthermore, to apply a user's own artwork to a compact disc, the user must simply input the scanned or developed artwork to data processing system 100 and place that artwork in the folder associated with the compact disc in the CD Library folder. After executing step 322, a program flow returns to node 319.

Next, a step 324 may be executed to edit a name associated with the unique identifier of the compact disc. For example, when the unique identifier for the compact disc is accessed from the CD and a content folder is created with a default name, the default name is selected by the software application implemented by the present invention. If the user desires to edit that name to provide a name which is more recognizable, CPU 110 determines whether control signals were received to modify the title of the compact disc associated with the unique identifier in a step 326. If the control signals received by CPU 110 from user interface adapter 122 indicate that the title associated with the compact disc should be modified, CPU 110 provides the appropriate control, data, and address signals to update a name of the CD within the catalog and CD library stored within RAM 114 of data processing system 100. It should be noted that modification of memory to reflect more current values is well-known to those with skill in the relevant art and a specific explanation of operation will not be provided in greater detail herein. After a name is updated in the catalog and CD library in step 326, a program flow returns to node 319.

Step 332 is executed by the software program of the present invention to determine whether additional inputs are provided to data processing system 100 via one of the plurality of user interface devices 124–150. Should another input be received by user interface adapter 122 in a step 332, appropriate control signals will be provided to CPU 110. CPU 110 will subsequently perform actions required by the inputs in step 334. After execution of step 334, a program flow returns to node 319. Examples of such other inputs may include play, pause, stop, move, and size.

Next, if a user desires to end operation of the CD application, the user will provide an input indicative of this desire via one of the plurality of user interface devices 124–132. The input is then provided to user interface adapter 122, where it is communicated with CPU 110. CPU 110 will subsequently provide the appropriate control signals to end the compact disc application in a step 328. A program flow is subsequently ended in a step 330.

By using the methodology described in FIGS. 2 and 3, the present invention effectively and intuitively allow a user to associate artwork and a desired name with a unique identifer for a compact disc accessed by a compact disc application of data processing system 100. An example utilizing the methodology of the present invention will be illustrated and described below.

Figure 4:
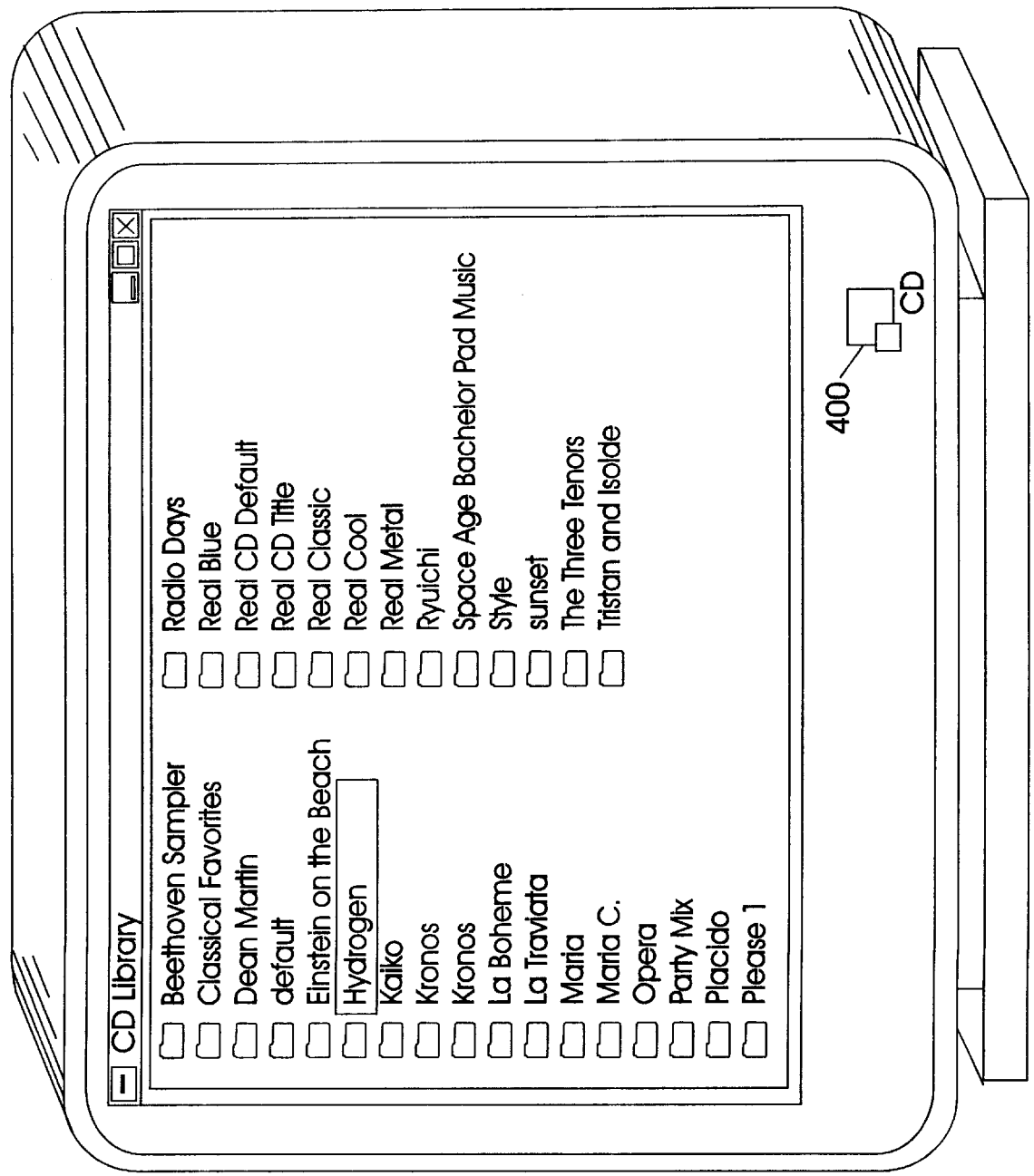
FIG. 4 illustrates, in block diagram form, a display device in accordance with one embodiment of the present invention.

For illustrative purposes, refer now to FIG. 4. Assume that the CD application has been installed according to the methodology set forth in FIG. 2. Notice that in FIG. 4, the CD Library has been created as specified in step 206 of FIG. 2. Additionally, sub-sub-directories have been created, as specified in step 208 of FIG. 2, for each of the compact discs which have previously been played using the compact disc application of the data processing system implemented by the present invention. Note, that in one embodiment of the present invention, the compact disc application used to play the compact disc listed in the CD Library are played using CD application 400, as represented by the icon illustrated in FIG. 4.

Figure 5:
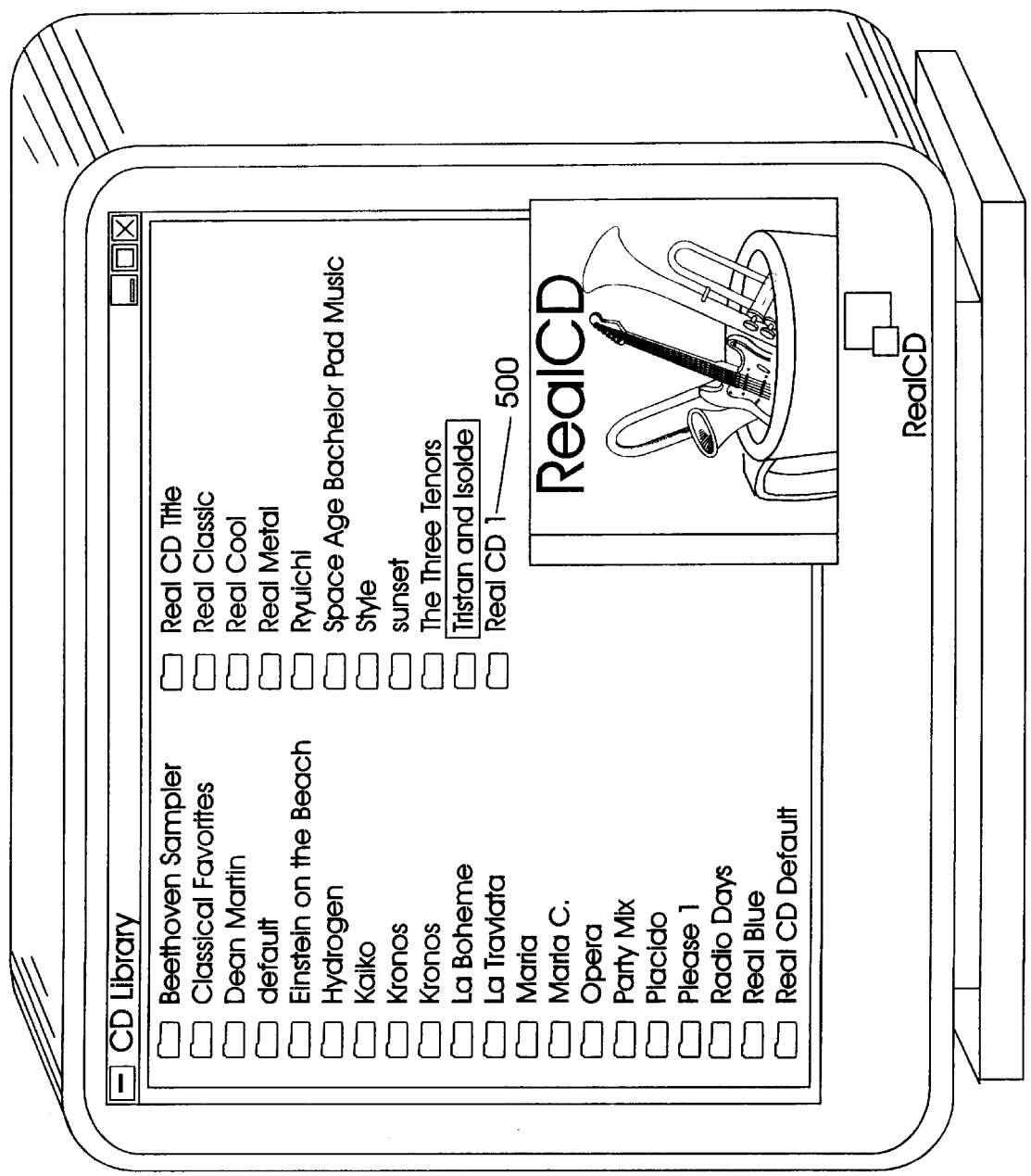
FIG. 5 illustrates, in block diagram, a display device in accordance with one embodiment of the present invention.

Refer now to FIG. 5. In FIG. 5, an external user has inserted a compact disc into CD drive 150 in accordance with step 302 of FIG. 3. A unique ID is subsequently read from the inserted compact disc in accordance with the standard defined by the "Red Book." As the CD inserted within CD drive 150 has not previously been played by the CD application implemented by the present invention, an entry for the unique identifiers made within the catalogs stored in RAM 114 of data processing system 100. Additionally, a default name of "real CD 1" is created and is stored in the catalog at a memory location associated with the unique identifier. Subsequently, a CD content folder 500 is created in the CD Library with a default name. It should be noted that each of the aforementioned steps corresponds to steps 310–314 of FIG. 3.

Furthermore, artwork to be associated with the compact disc is then accessed from the folder in the CD library. As no custom artwork has been specified, default artwork, such as that illustrated in FIG. 5, is accessed in step 316 of FIG. 3. After accessing the artwork, the CD application is loaded with the associated artwork in a designated position, such as that illustrated in FIG. 5.

Next, assume that an external user desires to modify a name associated with the compact disc to make this compact disc more recognizable. This operation may be performed by accessing the title associated with the folder in the CD library. As previously mentioned, such access operations are performed in response to user interface inputs received from one of the plurality of user interface devices 124–150. Additionally, the artwork associated with the compact disc may be "opened" under control of user inputs provided via one of the plurality of user interface devices 124–150. By "opening" the display a compact disc on display device 138, the object displayed on display device 138 is modified to appear to be an opened CD case to an external user. As may be seen in FIG. 6, it is noted that the user change the title associated with the unique identifier of the compact disc currently being played to "II Postino." This modification is reflected both in the label associated with the folder corresponding to the compact disc and in the open form of the graphical display of the compact disc on display device 138. This modification is reflected in step 326 of FIG. 3.

Figure 6:
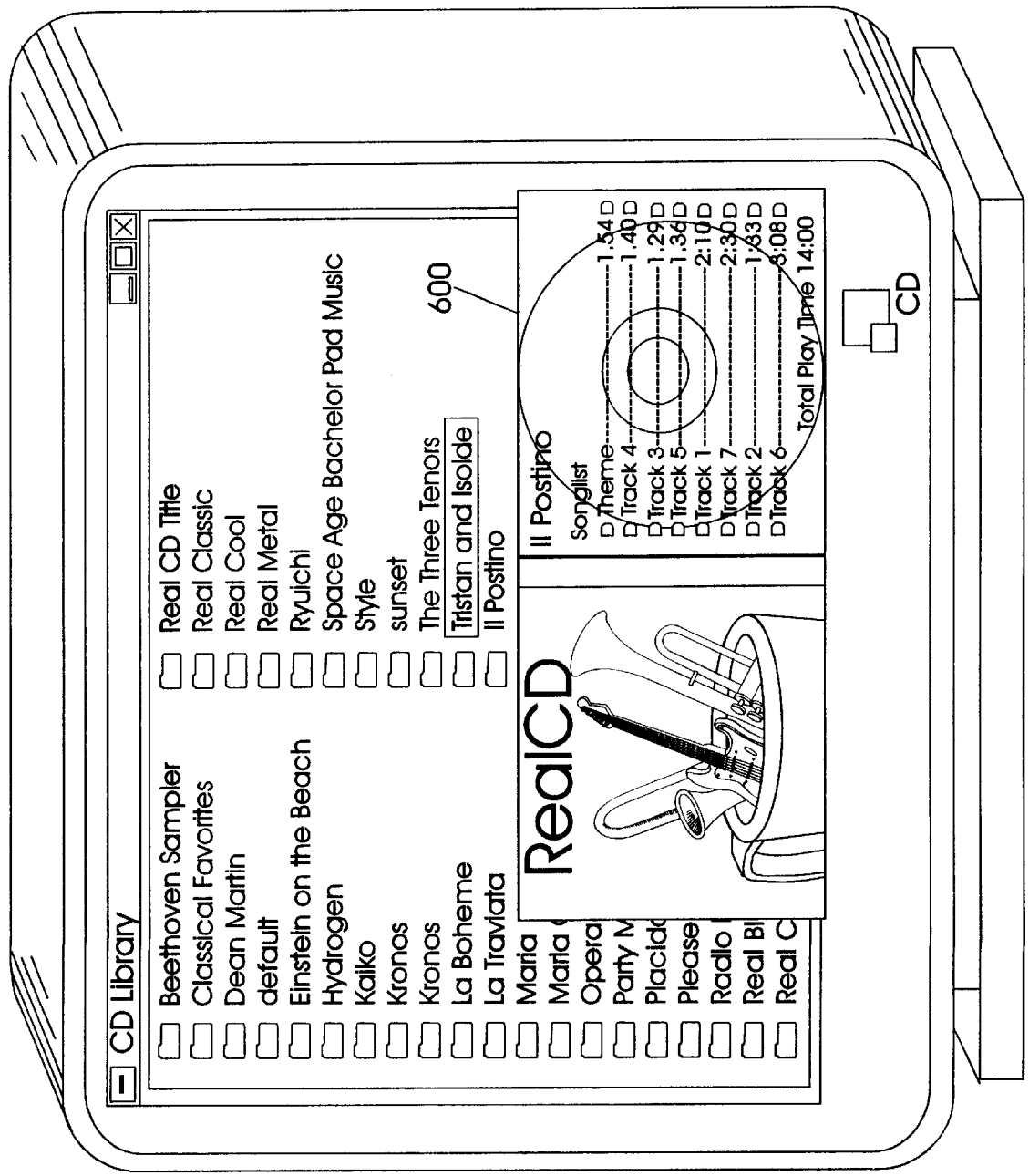
FIG. 6 illustrates, in block diagram, a display device in accordance with one embodiment of the present invention.

In an alternative implementation, the title of the folder associated with the compact disc may be modified by modifying the title of the compact disc within the graphical display 600 of FIG. 6. Again, a user must merely access the title and retype in a new one to modify the title of both the graphical display and the title of the folder associated with the compact disc.

Continuing to refer to FIG. 6, note that a name is associated with each of the tracks of the compact disc inserted into CD drive 150. Furthermore, notes that the default names are merely "track x," where "x" refers to a sequential numbering of the track of the CD. It should be noted that the titles of each of the tracks may be modified to reflect an actual name of a song or musical arrangement in a manner such as that previously described.

Figure 7:
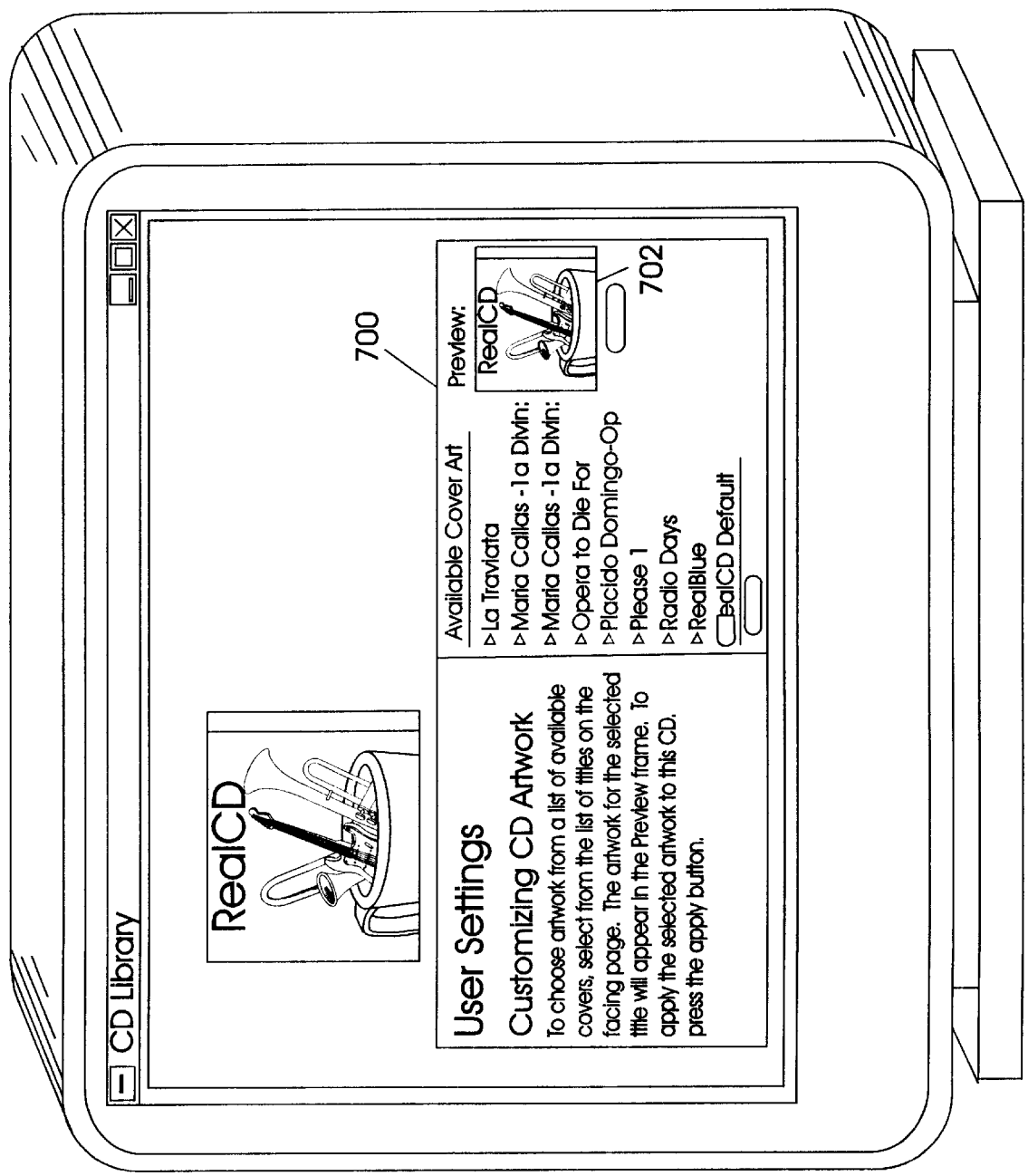
FIG. 7 illustrates, in block diagram, a display device in accordance with one embodiment of the present invention.

After the name has been updated in the catalog and the CD library in step 326, a program flow returns to step 319. Next, assume that a user desires to modify the artwork associated with the folder compact disc corresponding thereto. To edit the artwork, the user provides an input via one of the plurality of user interface devices 124–132 to indicate that the artwork is desired to be modified. It should be modified that in FIG. 6, a user may place a cursor on the artwork associated with the opened version of a compact disc and click thereon. By clicking thereon, CPU 110 provides the appropriate control and data signals to display a menu, such as that illustrated in FIG. 7 on display device 138. Menu 700 provides a plurality of instructions and choices to be selected by a user when making their artwork display decisions. Additionally, menu 700 provides a preview screen to illustrate each of the available cover art choices. As explained in menu 700, to choose artwork from a list of available covers displayed on menu 700, a user must provide a user input to select one of the plurality of titles illustrated therein. The selected artwork will then appear in a preview frame 702. Subsequently, to apply the selected artwork to the CD, the user may "press" the Apply button through the use of inputs provided via one of the plurality of user interface devices 124–150.

Furthermore, for the user to apply their own artwork to the compact disc, the user may input the artwork via user interface adapter 122 and subsequently place the artwork in the folder of the CD library that is associated with the inserted compact disc.

Figure 8:
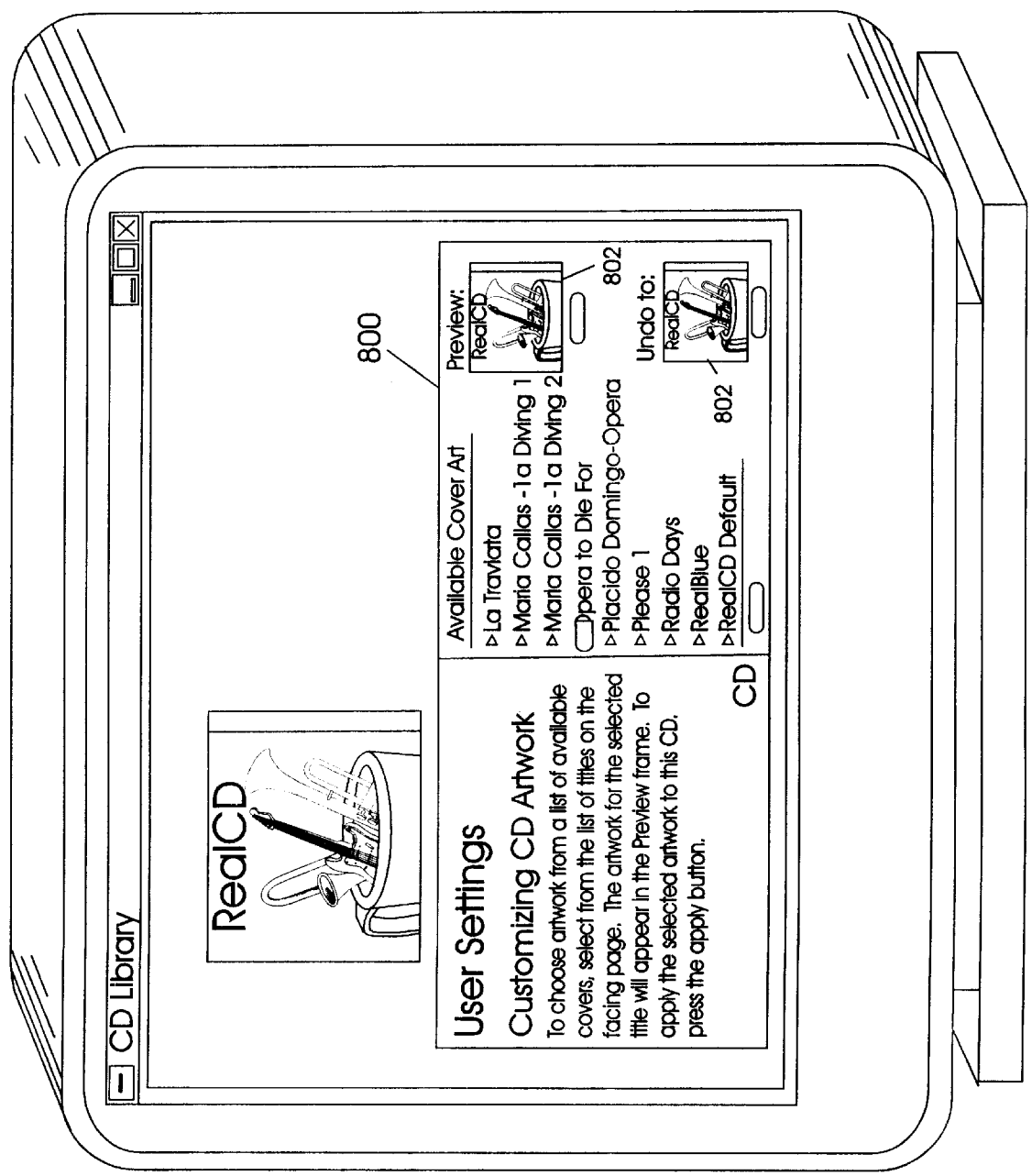
FIG. 8 illustrates, in block diagram, a display device in accordance with one embodiment of the present invention.

FIG. 8 illustrates a graphical user interface displayed on display device 138 after a user has selected one of the list of available cover art. It should be noted that the user selected the cover art labeled "Opera to Die For." Thus, the cover art associated with that title is illustrated in preview frame 802. When an Apply button is selected, this artwork is transferred to the folder associated with the compact disc and the artwork displayed on the graphical user interface is modified in accordance therewith. Furthermore, note that when the artwork is applied, an undo frame 804 is displayed on menu 800 of FIG. 8. By implementing the undo frame 802, a user is able to select an Undo button to cause the artwork associated with the compact disc to revert to its previous form.

By now it should be apparent that there has been provided a data processing system and methodology for implementing a graphical user interface which allows a user to associate artwork with each compact disc accessed by a compact disc application. It should be noted that there are many additional configurations for implementing the invention described above. For example, the title specific artwork may be maintained in a private directory, such that users are unable to modify it.

Additionally, while there may have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. An apparatus comprising:
   a processor for executing a first data processing program and for creating a sub-directory having a plurality of folders in response to the first data processing program wherein a first one of the plurality of the folders stores a user selectable unique graphical representation associated with a corresponding compact disc accessed by the first data processing program; and
   a display device for displaying a first one of the plurality of folders and the unique graphical representation associated with the corresponding compact disc;
   A user interface capable of receiving a plurality of control inputs for selectively modifying a first unique graphical representation associated with a corresponding compact disc to have a second unique graphical representation.

2. The apparatus of claim 1, wherein the first data processing program is a compact disc player program.

3. The apparatus of claim 1, further comprising:
   wherein the unique graphical representation is the cover of the compact disc.

4. The apparatus of claim 3, further comprising:
   a memory for storing the second visual representation at a first memory address.

5. The apparatus of claim 3, further comprising:
   input means for receiving the second visual representation from an input device external to the central processing unit.

6. A method for operating a processor comprising the steps of:
   executing a first data processing program using a processor;
   creating a sub-directory having a plurality of folders in response to the first data processing application;
   storing a user selectable unique graphical representation associated with a corresponding compact disc accessed by the first data processing program in a first one of the plurality of folders; and
   displaying the first one of the plurality of folders and the unique graphical representation associated with the corresponding compact disc using a display device;
   receiving, via a user interface, a plurality of control inputs capable of selectively modifying a first unique graphical representation associated with a corresponding compact disc to have a second unique graphical representation.

7. The method of claim 6, wherein the first data processing program is a compact disc player program.

8. The method of claim 6, wherein the visual representation is a first visual representation of the cover of the compact disc.

9. The method of claim 4, further comprising the steps of:
   receiving a plurality of control inputs at an user interface; and
   selectively modifying the first visual representation of the cover of the compact disc to have a second visual representation in response to the plurality of control inputs.

10. The method of claim 5, further comprising the step of:
    receiving the second visual representation from an input device external to the central processing unit.

* * * * *